United States Patent [19]
Fukuda et al.

[11] Patent Number: 4,751,356
[45] Date of Patent: Jun. 14, 1988

[54] TEMPERATURE DETECTING DEVICE, MICROWAVE COOKING APPARATUS USING THE SAME, AND DATA CORRECTING METHOD THEREOF

[75] Inventors: Norisuke Fukuda, Tokyo; Fumio Watanabe, Yokohama, both of Japan

[73] Assignee: Kabushiki Kaisha Toshiba, Kawasaki, Japan

[21] Appl. No.: 764

[22] Filed: Jan. 6, 1987

[30] Foreign Application Priority Data

Jan. 17, 1986 [JP] Japan .................................. 61-7464

[51] Int. Cl.$^4$ .............................................. H05B 9/06
[52] U.S. Cl. .............................. 219/10.55 B; 219/497; 219/506; 356/316; 356/51; 250/338.3; 374/132; 374/121
[58] Field of Search ................. 219/10.55 B, 506, 502, 219/497, 494, 499, 501; 356/328, 319, 334, 43–45, 316; 250/338, 349, 350, 351; 350/331 R; 374/122, 132, 121

[56] References Cited

U.S. PATENT DOCUMENTS

| | | | |
|---|---|---|---|
| 3,906,221 | 9/1975 | Mercier ................................ | 250/338 |
| 4,068,811 | 1/1978 | Caulier ................................ | 374/127 |
| 4,245,143 | 1/1981 | Miura et al. ................... | 219/10.55 B |
| 4,520,282 | 9/1985 | Landa et al. ......................... | 356/328 |
| 4,589,732 | 5/1986 | Shiraishi et al. ................ | 350/331 R |
| 4,602,159 | 7/1986 | Kesehara et al. .................... | 250/338 |
| 4,657,386 | 4/1987 | Suwez-Gonzalez et al. ......... | 356/45 |

FOREIGN PATENT DOCUMENTS

| | | |
|---|---|---|
| 53-59948 | 5/1978 | Japan . |
| 60-144626 | 7/1985 | Japan . |
| 966676 | 8/1964 | United Kingdom . |
| 2149912 | 6/1985 | United Kingdom . |

*Primary Examiner*—M. H. Paschall
*Attorney, Agent, or Firm*—Cushman, Darby & Cushman

[57] ABSTRACT

A temperature detecting device detects infrared rays from an object to be measured and determines the temperature of the object based on the detection result. To avoid the influence of contamination adhered to the infrared ray incident surface of an infrared ray detecting unit, a correction coefficient for the detection result of the infrared ray detecting unit is determined before actual temperature detecting starts. For this purpose, the infrared rays fed from the object into the infrared ray detecting unit are interrupted by a shutter device. The infrared ray detecting unit detects the infrared rays fed from the shutter device through the infrared ray incident surface, and it outputs a first detection value corresponding to the shutter temperature. A shutter temperature detecting element directly detects the actual temperature of the shutter device, and it outputs a second detection value corresponding to the actual temperature of the shutter device. The correction coefficient is determined by comparing the second detection value from the shutter temperature detecting element with the first detection value from the infrared ray detecting unit. Subsequently detected temperatures are then corrected by this correction coefficient.

9 Claims, 3 Drawing Sheets

TEMPERATURE DETECTING DEVICE, MICROWAVE COOKING APPARATUS USING THE SAME, AND DATA CORRECTING METHOD THEREOF

BACKGROUND OF THE INVENTION

1. Field of the Invention

The present invention relates, in general, to temperature detecting devices. More specifically, the invention relates to a temperature detecting device, having an infrared ray detector, which is used in cooking apparatuses such as microwave ovens to detect the temperature of food being cooked.

2. Description of the Prior Art

Cooking apparatuses, such as, e.g., microwave ovens, having a microcomputer are well known. A cooking apparatus of this type also has various sensors for detecting the temperature of food being cooked. The cooking apparatus may carry out a suitable cooking operation in accordance with the detection result of the sensors as the food is being cooked. In particular, an infrared ray detector generally is used as a sensor in this type of cooking apparatus. The infrared ray detector detects infrared rays from the food, and the microcomputer calculates the temperature of the food on the basis of the intensity of the infrared rays detected. The output of a magnetron (a heating source), therefore, may be controlled by the microcomputer in response to the temperature changes of the food.

The infrared ray detector, generally, is a type of optical sensor. The infrared ray detector is arranged above the food, for example, on the ceiling of a heating chamber, to receive infrared rays from the food.

In the system described above, a reduction in sensitivity of the infrared ray detector often occurs after long time use due to contamination such as grease from the food produced during cooking. The contaminant adheres to the incident surface of the infrared ray detector, and accumulation thereof reduces the intensity of infrared rays reaching the infrared ray detector from the food.

SUMMARY OF THE INVENTION

It is an object of the invention to more accurately determine the temperature of an object from infrared ray emissions.

It is another object of the invention to improve temperature detection characteristics of a microwave cooking apparatus.

It is still another object of the invention to provide a method for correcting output data from an infrared ray detector of a temperature detecting device to compensate for contamination of the detector.

To accomplish the above objects, a temperature detecting device includes a shutter device including a shutter element and a solenoid which drives the shutter element, for interrupting the path of infrared rays from an object to be measured.

The temperature detecting device in accordance with the invention further includes an infrared ray detector having an infrared ray permeable surface subject to contamination by deposits of foreign substances, for receiving infrared rays through the infrared ray permeable surface along the path, and for generating a first output corresponding to the intensity of infrared rays from the object, and a second output corresponding to the intensity of infrared rays from the shutter element when the path is interrupted.

The temperature detecting device further includes a shutter temperature detecting device and a comparison circuit. The shutter temperature detecting device detects the temperature of the shutter element of the shutter device and generates a shutter temperature signal. The comparison circuit compares the shutter temperature signal with the second output and generates a correction signal for modifying the first output.

The temperature detecting device also may include a temperature determining circuit for generating a temperature value corresponding to the temperature of the object from the first output and the correction signal.

BRIEF DESCRIPTION OF THE DRAWINGS

The present invention is best understood with reference to the accompanying drawings in which.

DETAILED DESCRIPTION OF THE PREFERRED EMBODIMENT

Figure 1:
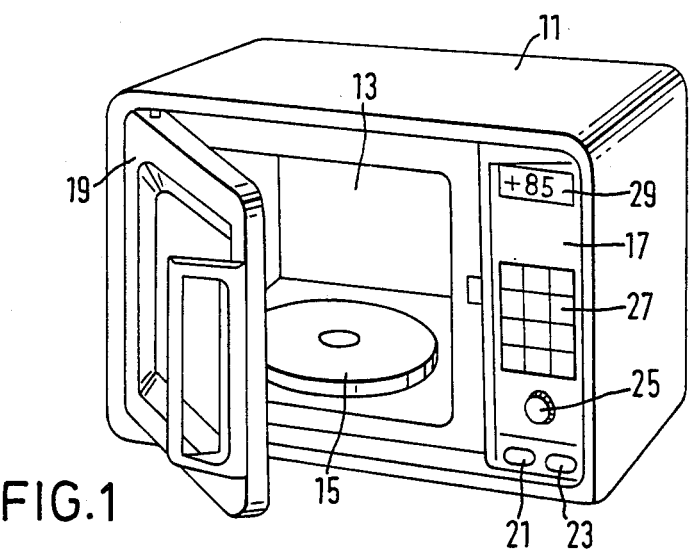
FIG. 1 is a perspective view illustrating a microwave oven using one embodiment of the present invention.

The preferred embodiment of the present invention will now be described in more detail with reference to the accompanying drawings. FIG. 1 is a perspective view of a microwave oven using a temperature detecting device of the present invention.

As shown in FIG. 1, a microwave oven body 11 includes a heating chamber 13 wherein a rotary tray 15 is arranged. An operation panel 17 is provided on the front right side of body 11. A door 19 is hinged at the front side of body 11 to open and close heating chamber 13. Cooking start and stop keys 21 and 23 are arranged at the lower portion of operation pannel 17. A temperature set knob 25 for setting a desired cooking temperature is provided at the middle portion of operation panel 17. A plurality of touch-switches 27, each of which indicates a different kind of cooking, are also provided at the middle portion of operation panel 17. A user may select and set a desired cooking operation by using the corresponding touch-switch from touch-switches 27. A display device 29 also is provided at the upper portion of operation panel 17. Cooking information, such as, e.g., the temperature of the food detected or the remaining cooking time, is displayed in display device 29.

Figure 2:
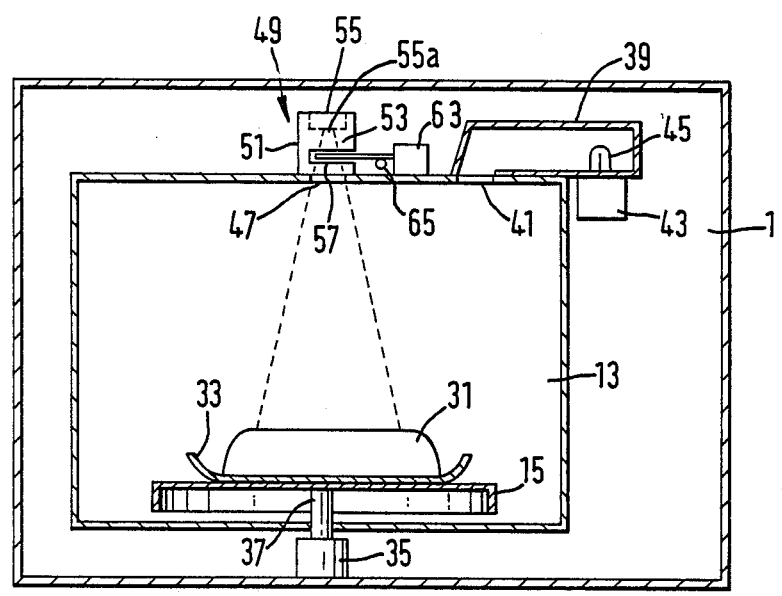
FIG. 2 is a schematic view illustrating the interior of the microwave oven, as shown in FIG. 1.

As can be seen in FIG. 2, food 31 on tray 33 is put on rotary tray 15. Rotary tray 15 is driven by a motor 35, fixed on the bottom surface of body 11, through a rotating shaft 37. A wave-guide 39 is mounted on heating chamber 13. One end of wave-guide 39 communicates with heating chamber 13 through a supply opening 41 in the upper surface of heating chamber 13. A magnetron device 43 is mounted to the other end of wave-guide 39, and an antenna 45 of magnetron device 43 is positioned inside wave-guide 39. The microwaves generated by magnetron device 43 are fed from antenna 45 into heating chamber 13 through wave-guide 39 and supply opening 41.

Figure 4:
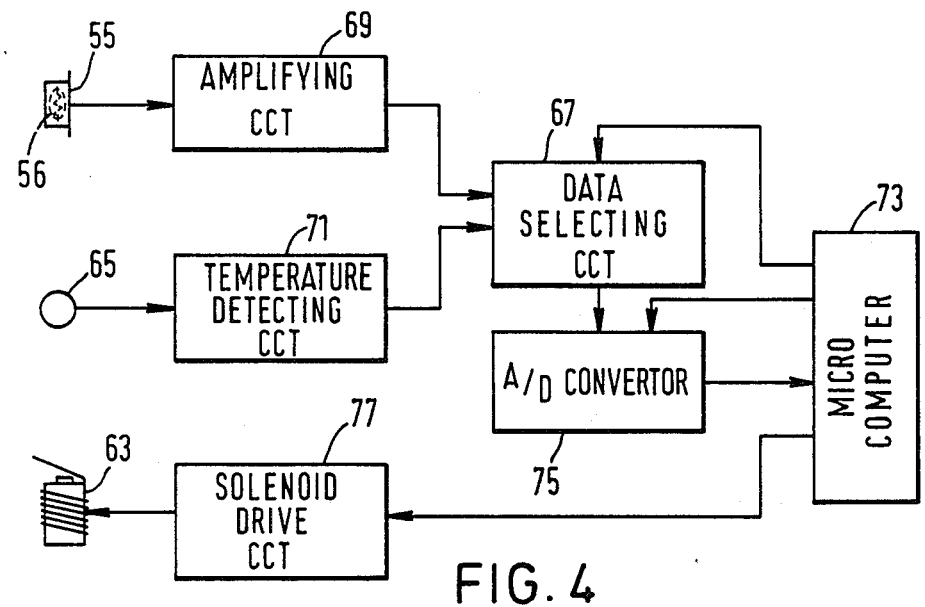
FIG. 4 is a block diagram of one embodiment.

As shown also in FIG. 2, an infrared ray permeable opening 47 is provided at the center of the upper surface of heating chamber 13. An infrared ray detecting device 49 is arranged above infrared ray permeable opening 47. Infrared ray detecting device 49 is composed of a supporting housing 51 in which a cone-shaped infrared ray guide 53 is formed. Infrared ray detecting device 49 also includes an infrared ray detecting unit 55 in which an infrared ray detecting element 56 is arranged, as shown in FIG. 4. In this embodiment, infrared ray detecting element 56 is a thermal type infrared ray detector, such as, e.g., a thermopile, a thermistor bolometer, etc. Infrared ray detecting element 56 transforms the temperature change responding to the change of intensity of infrared rays from the food into a corresponding electric signal.

Infrared ray detecting unit 55 is fixed in the uppermost portion of supporting housing 51, and the incident surface 55a thereof faces toward cone-shaped infrared ray guide 53. Cone-shaped infrared ray guide 53 is formed such that it becomes gradually smaller in diameter from the lower portion of supporting housing 51 toward the upper portion where infrared ray detecting unit 55 is fixed.

As can be seen in FIG. 2, a slit 57 is provided at the middle portion of supporting housing 49. Slit 57 extends, in the horizontal direction, from the outer surface of supporting housing 49 to the inside of supporting housing 49, and traverses infrared ray guide 53.

Figure 3:
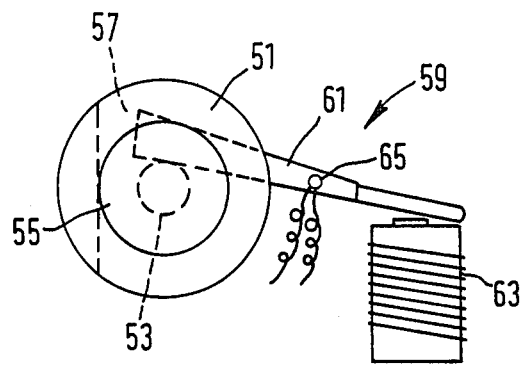
FIG. 3 is a plan view illustrating the relationship between the infrared ray detecting unit and the shutter device of one embodiment, as shown in FIG. 2.

As shown in FIG. 3, a shutter device 59 is composed of a shutter element 61 and a solenoid 63 which drives shutter element 61. Shutter element 61 is inserted into slit 57 of supporting housing 49. When solenoid 63 of shutter device 59 is inactive, shutter element 61 is positioned out of infrared ray guide 53, (hereinafter referred to as a "first position"), so that infrared ray detecting unit 55 may receive the infrared ray from food 31 through infrared ray permeable opening 47 and infrared ray guide 53 of supporting housing 49. On the other hand, infrared ray detecting unit 55 receives no infrared rays from food 31 when solenoid 63 is activated. This is because shutter element 61 is moved into infrared ray guide 53 along slit 57, and it interrupts the infrared rays entering into infrared ray guide 53 from the food 31 through infrared ray permeable opening 47 (hereinafter referred to as a "second position"). A shutter temperature detecting element 65, e.g., a thermistor, is attached to shutter element 61 of shutter device 59, as shown in FIGS. 2 and 3, to detect the shutter temperature.

FIG. 4 is a circuit diagram of this embodiment. An output of infrared ray detecting element 56 in infrared ray detecting unit 55 is fed to a data selecting circuit 67 through an amplifying circuit 69. The output of shutter temperature detecting element 65 is also supplied to a temperature detecting circuit 71. Temperature detecting circuit 71 transforms the resistance value of shutter temperature detecting element 65 corresponding to the temperature of shutter element 61 into the corresponding electric signal, and feeds it to data selecting circuit 67.

Data selecting circuit 67 selects the data between the outputs of amplifying circuit 69 and temperature detecting circuit 71 in accordance with the command signal from microcomputer 73, and it feeds the selected data to microcomputer 73 through an A/D converter 75. In this case, therefore, these two outputs from amplifying circuit 69 and temperature detecting circuit 71 are serially supplied to microcomputer 73.

Microcomputer 73 calculates the surface temperature of food 31 on the basis of the output of infrared ray detecting element 56, and it controls the output power (microwave) of magnetron device 43. Microcomputer 73 also controls solenoid 63 of shutter device 59 through a solenoid drive circuit 77 to drive shutter element 61.

It should be noted that infrared ray detecting element 56 arranged in infrared ray detecting unit 55 is maintained in a homeothermal state without influence from the actual temperature change in the vicinity of infrared ray detecting unit 55. Therefore, the output of infrared ray detecting element 56 corresponds to the temperature difference between the temperature of the infrared ray detecting element 56 (homeothermal state) and the temperature of food 31. In this embodiment, since the infrared ray detecting element 56 is kept in the homeothermal state, the output thereof only directly corresponds to the temperature of the food 31 if no contaminant is deposited on the incident surface 55a of infrared ray detecting unit 55.

In this case, the temperature data representing the relationship between the output voltage of infrared ray detecting element 56 and the actual temperature of the food is previously stored in a RAM (read only memory) of microcomputer 73. Since the output of infrared ray detecting element 56 varies with the progress of the cooking, each output of infrared ray detecting element 56 represents the temperature of the food at a given time. Each output of infrared ray detecting element 56 is calibrated to conform to the temperature data stored in the RAM of microcomputer 73 by regulation of the gain of amplifying circuit 69 after assembly of the apparatus.

Figure 5:
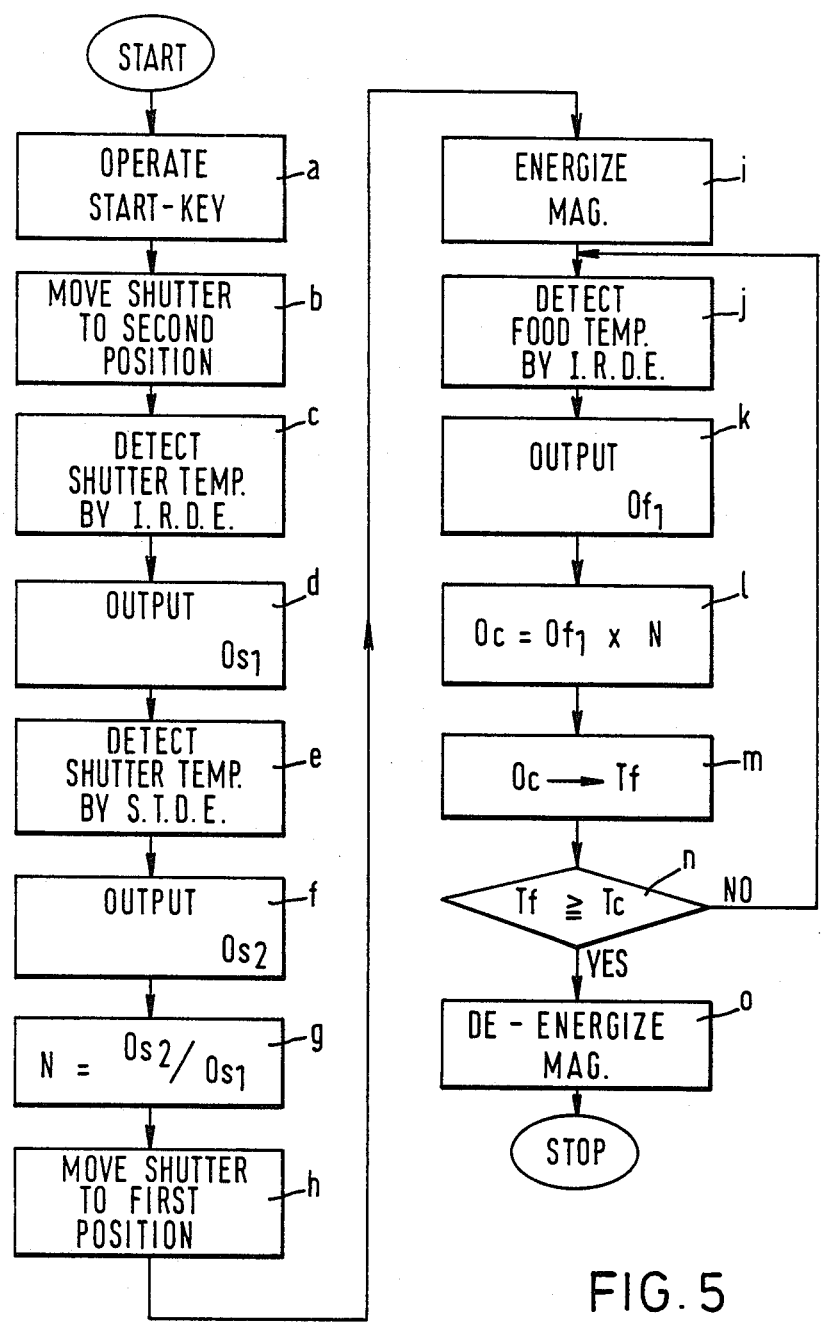
FIG. 5 is a flow chart showing automatic cooking of the microwave oven, as shown in FIGS. 1 and 2.

The cooking operation of the above-described microwave oven now will be described with reference to FIG. 5.

Firstly, a user puts food 31 on tray 33 on rotary tray 15 in heating chamber 13 and closes door 19. The user, furthermore, selects a desired cooking operation from touch-switches 27 on which the different kinds of cooking operation are displayed. The cooking data of the desired cooking operation is fed to microcomputer 73. At this time, a cooking completion temperature Tc also is set to microcomputer 73.

When the user operates start-key 21, microcomputer 73 activates solenoid 63 through a solenoid drive circuit 77, and shutter element 61 is moved into the second position where shutter element 61 interrupts infrared rays from food 31 (steps a and b). At this state, infrared ray detecting element (I.R.D.E.) 56 of infrared ray detecting unit 55 detects the intensity of infrared rays from shutter element 61 of shutter device 59 throuh the incident surface 55a rather than from food 31. Therefore, the detection value Os1 of infrared ray detecting element 56 corresponds to the temperature of shutter element 61 (step c).

The detection value Os1 of infrared ray detecting element 56 is fed to microcomputer 73 through amplifying circuit 69, data selecting circuit 67 and A/D converter 75 (step d). If contamination has accumulated on the incident surface 55a of infrared ray detecting unit 55, the intensity of infrared rays from shutter element 56 is reduced through the incident surface 55a. Therefore, the detection value Os1 of infrared ray detecting element 56 does not represent the actual temperature Ts of shutter element 61.

The actual temperature Ts of shutter element 61 is directly detected by shutter temperature detecting element (S.T.D.E.) 65, and the detection value Os2 of shutter temperature detecting element 65 is fed to microcomputer 73 through temperature detecting circuit 71, data selecting circuit 67 and A/D converter 75 (steps e and f). Since shutter temperature detecting element 65 directly detects the actual temperature Ts of shutter element 61, the detection value Os2 of shutter temperature detecting element 65 accurately represents the actual temperature Ts of shutter element 61.

In step g, microcomputer 73 determines the correction coefficient N from the following Equation:

$$N = Os2/Os1.$$

In step h, microcomputer 73 deactivates solenoid 63 through solenoid drive circuit 77, and shutter element 61 is again moved to the first position where shutter element 61 permits infrared ray detecting element 56 to receive infrared rays from food 31, as shown in FIG. 3. At this stage, microcomputer 73 energizes magnetron device 43, and microwaves are radiated from antenna 45 of magnetron device 43. Microwaves from antenna 45 are fed into heating chamber 13 through wave-guide 39 and supply opening 41, and food 31 on tray 33 is cooked by dielectric heating (step i).

The intensity of infrared rays from food 31 varies with the progress of the cooking. Infrared ray detecting element 56 detects these infrared rays from food 31, and the detection value Of1 of infrared ray detecting element 56 is fed to microcomputer 73 through amplifying circuit 69, data selecting circuit 67 and A/D converter 75 (steps j and k). Then, in step 1, a corrected output data Oc of infrared ray detecting element 56 is obtained by multiplying the detection value Of1 of infrared ray detecting element 56 by correction coefficient N. The actual temperature Tf of food 31 thus is determined in accordance with the corrected value Oc of infrared ray detecting element 56, and the temperature data is stored in the RAM of microcomputer 73 (step m).

As described above, the actual temperature Tf of food 31 may be obtained even if contamination has adhered to the incident surface 55a of infrared ray detecting unit 55. For example, if the detection sensitivity of infrared ray detecting element 56 decreases 50% because of contamination, the detection value Os1, representing the shutter temperature detected by infrared ray detecting element 56 is 50% reduced in comparison with the detection value Os2, representing the real shutter temperature detected by shutter temperature detecting element 65. That is, the correction coefficient N is 2. Infrared ray detecting element 56 outputs its detection value Of1 while infrared ray detecting element 56 detects infrared rays from food 31. The corrected value Oc of infrared ray detecting element 56 is obtained by multiplying the detection value Of1 of infrared ray detecting element 56 by 2 (correction coefficient). The actual temperature Tf of food 31 is, then, obtained from the temperature data stored in the RAM of microcomputer 73 in accordance with the corrected value Oc.

In decision step n, if the temperature Tf of food 31 is under the cooking completion temperature Tc, the NO-path is taken. Otherwise, microcomputer 73 determines that cooking has completed, and the YES-path is taken. When the NO-path is taken, microcomputer 73 repeatedly executes the steps from j to n until the food temperature Tf becomes more than the cooking completion temperature Tc. When the YES-path is taken, microcomputer 73 de-energizes magnetron device 43, and the cooking is completed (step o).

As can be understood from the above-described embodiment, the temperature detecting device of the present invention may achieve accurate temperature detection for an object to be measured even though the detection sensitivity of the infrared ray detecting device decreases because of contamination adhered on the incident surface of the infrared ray detecting device.

The present invention has been described with respect to a specific embodiment. However, other embodiments based on the principles of the present invention should be obvious to those of ordinary skill in the art. Such embodiments are intended to be covered by the claims.

What is claimed is:

1. A temperature detecting device for measuring the temperature of an object from infrared rays emitted by the object, comprising:

shutter means for interrupting the path of infrared rays from the object;

infrared ray detecting means, having an infrared ray permeable surface subject to contamination by deposits of foreign substances, for receiving infrared rays through the infrared ray permeable surface along the path, and for generating a first output corresponding to the intensity of the infrared rays from the object and a second output corresponding to the intensity of infrared rays from the shutter means when the path is interrupted;

shutter temperature detecting means for directly detecting the actual temperature of the shutter means and for generating a shutter temperature signal; and correction means for modifying the first output of the infrared ray detecting means in response to the shutter temperature signal and the second output to thereby compensate for improper readings of the intensity of infrared rays from said object.

2. A temperature detecting device according to claim 1, wherein the correction means includes comparison means for comparing the shutter temperature signal with the second output and for generating a correction signal for modifying the first output.

3. A temperature detecting device according to claim 2, said correction means further including actual temperature calculating means for generating a temperature value corresponding to the actual temperature of the object based on the first output and the correction signal.

4. A temperature detecting device according to claim 1, wherein the infrared ray detecting means includes a thermopile whose thermoelectromotive force varies in response to the intensity of infrared rays from the object.

5. A temperature detecting device according to claim 4, wherein the shutter temperature detecting means includes a thermistor whose resistance value varies in response to the temperature change of the shutter means.

6. A temperature detecting device according to claim 1, wherein the infrared ray detecting means includes a thermistor bolometer whose resistance value varies in response to the intensity of infrared rays from the object.

7. A temperature detecting device according to claim 1, wherein the shutter means includes a shutter and a solenoid for driving the shutter.

8. A microwave cooking apparatus comprising:
   means for supplying microwaves to food to be cooked;
   a temperature detecting device including:
      shutter means for interrupting the path of infrared rays from the food,
      infrared ray detecting means, having an infrared ray permeable surface subject to contamination by deposits of foreign substances, for receiving infrared rays through the infrared ray permeable surface along the path, and for generating a first output corresponding to the intensity of infrared rays from the food and a second output corresponding to the intensity of infrared rays from the shutter means when the path is interrupted,
      shutter temperature detecting means for directly detecting the actual temperature of the shutter means and for generating a shutter temperature signal,
      comparison means for comparing the shutter temperature signal with the second output and for generating a correction signal, and
      temperature determining means for generating a temperature value corresponding to the actual temperature of the food based on the first output and the correction signal, said first output being corrected by said correction signal to generate said temperature value, thereby compensating for improper readings of the intensity of infrared rays from said object; and
   cooking completion means for controlling the cooking completion when the temperature value from the temperature determining means is more than a predetermined temperature value.

9. A method for correcting a detection value from an infrared ray detector having a shutter and a shutter temperature detector, comprising the steps of:
   activating the shutter to prevent the infrared ray detector from receiving infrared rays from an object to be measured;
   detecting the intensity of infrared rays from the shutter using the infrared ray detector;
   outputting a first detection value, corresponding to the intensity of infrared rays emitted by the shutter, from the infrared ray detector;
   detecting the actual temperature of the shutter using the shutter temperature detector;
   outputting a second detection value, corresponding to the actual temperature of the shutter, from the shutter temperature detector;
   determining a correction value by comparing the first detection value from the infrared ray detector with the second detection value from the shutter temperature detector;
   deactivating the shutter to allow the infrared ray detector to receive infrared rays directly from the object;
   detecting the intensity of infrared rays from the object using the infrared ray detector;
   outputting a third detection value corresponding to the temperature of the object detected by the infrared ray detector; and
   modifying the third detection value of the infrared ray detector in response to the second detection value and the correction value to thereby compensate for improper readings of the intensity of infrared rays from said object being measured.

* * * * *